(12) United States Patent
Hiraguchi

(10) Patent No.: US 6,843,441 B2
(45) Date of Patent: Jan. 18, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 64 days.

(21) Appl. No.: 10/445,948

(22) Filed: May 28, 2003

(65) Prior Publication Data

US 2003/0222166 A1 Dec. 4, 2003

(30) Foreign Application Priority Data

May 29, 2002 (JP) .................................. 2002-156425

(51) Int. Cl.⁷ .......................................... G11B 23/107
(52) U.S. Cl. ................................................. 242/348.2
(58) Field of Search ........................... 242/348, 348.2; 360/132

(56) References Cited

U.S. PATENT DOCUMENTS

| | | |
|---|---|---|
| 6,505,789 B2 | 1/2003 | Ridl et al. |
| 6,628,479 B1 * | 9/2003 | Rambosek ................. 360/132 |
| 6,764,037 B2 * | 7/2004 | Hancock et al. ............ 242/348 |

* cited by examiner

Primary Examiner—John M. Jillions
(74) Attorney, Agent, or Firm—Sughrue Mion, PLLC

(57) ABSTRACT

At a recording tape cartridge, an opening, which is directed forward and toward a side, is formed by cutting off a corner portion at a side of loading the recording tape cartridge into a drive device. A leader pin and a magnetic tape are pulled out along a shortest path from the opening. The opening is opened and closed by a door, which is curved in an arc-shape, rotating so as to circle around outer sides of pin stands and a reel so as to wind its way past an outer side of a first screw boss and an inner side of a second screw boss which are positioned at both edge portions of the opening, without the door jutting out from a locus of movement which runs along a curved configuration of the door.

16 Claims, 12 Drawing Sheets

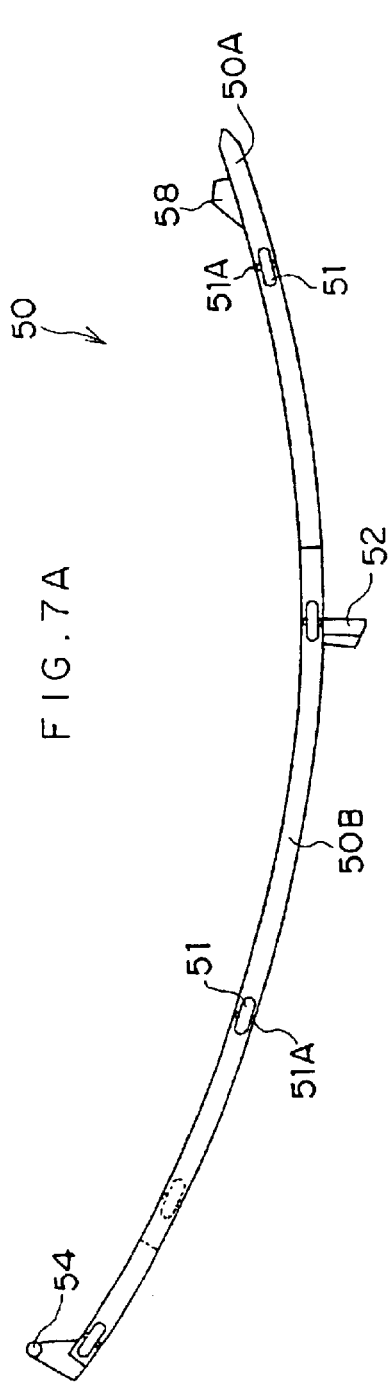
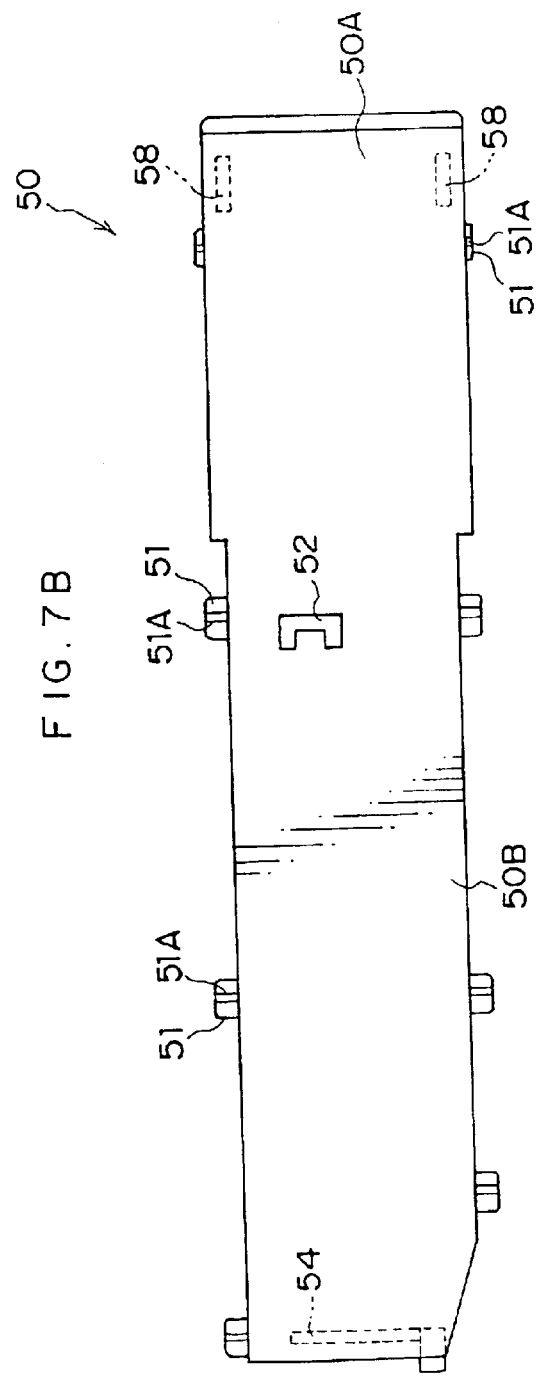
FIG. 7A
FIG. 7B

RECORDING TAPE CARTRIDGE

BACKGROUND OF THE INVENTION

1. Field of the Invention

The present invention relates to a recording tape cartridge rotatably accommodating a single reel, around which a recording tape such as a magnetic tape is wound.

2. Description of the Related Art

Conventionally, magnetic tape cartridges have been known in which a magnetic tape, which is used as a data recording/playback medium of a computer or the like, is wound on a single reel, and the reel is accommodated within a case. A leader member, which is a leader pin, a leader tape, or a leader block, for example, is provided at the distal end of the magnetic tape. A pull-out means provided at a drive device pulls out the leader member from an opening of the magnetic tape cartridge, and the magnetic tape fixed to the leader member is wound onto a take-up reel of the drive device.

A reel gear is carved in a ring shape at the center of the bottom surface of the reel which emerges from an opening formed in the bottom surface of the magnetic tape cartridge. Due to a driving gear, which is provided at a rotating shaft of the drive device, meshing with the reel gear, the reel is driven to rotate. Further, due to the reel of the magnetic tape cartridge and the take-up reel of the drive device being rotated synchronously, data can be recorded onto the magnetic tape or data recorded on the magnetic tape can be played back.

A large amount of information can be recorded in this magnetic tape cartridge, although little space is needed to accommodate the magnetic tape cartridge when it is stored. As shown in FIGS. 10 through 12, the position of the opening of the magnetic tape cartridge and the type of door for opening and closing the opening differ in accordance with the type of the leader member. Namely, in the case of a leader pin 108, as shown in FIG. 10, an opening 104 is formed in a side wall 102A of a case 102 which side wall 102A is parallel to the direction of loading the magnetic tape cartridge into a drive device (the direction of arrow A). The opening 104 is opened and closed by a door 106 which slides in the same direction as the loading direction.

However, if the opening 104 is provided at the side wall 102A of the case 102 in this way, the pull-out means of the drive device must pull the leader pin 108 out from the left-right lateral direction of the case 102 (i.e., non-rectilinearly). Thus, space for the pull-out means to move around the case 102 must be ensured in the left-right lateral direction of the case within the drive device, and the mechanism for moving the pull-out means around (i.e., non-rectilinearly) becomes complex. In other words, the drawback arises that the drive device becomes large. Moreover, there is the problem that the path along which a magnetic tape T is pulled out becomes long.

Further, in the case of a leader tape T, as shown in FIG. 11, an opening 116 is formed in a front wall 114A of a case 114 which front wall is orthogonal to the direction of loading the magnetic tape cartridge into a drive device (the direction of arrow A). A door 118, which opens and closes the opening 116, is a pivoting-type door which pivots toward the front around a shaft supported in a vicinity of a corner of the case 114. However, if the opening 116 is provided at the front wall 114A of the case 114 in this way, although there is no need for the pull-out means of the drive device to move non-rectilinearly, the door 118 opens over a wide area toward the front. Therefore, space must be ensured within the drive device such that nothing interferes with the door 118 when the opening 116 is to be opened. In short, a drawback arises in that the drive device becomes large.

Moreover, in the case of a leader block 126, as shown in FIG. 12, an opening 124 is formed by diagonally cutting off a corner portion of the front side of the case in the direction of loading the magnetic tape cartridge into the drive device. The opening 124 is opened and closed directly by the leader block 126. However, if the opening 124 is opened and closed by the leader block 126 in this way (namely, if the leader block 126 also functions as the door for opening and closing the opening), a problem arises in that it is easy for the leader block 126 to become scratched or dirtied. Specifically, the leader block 126 fits together with a reel hub 130 of the drive device and forms a portion of the reel hub 130. Thus, if a scratch is formed in or dirt adheres to the leader block 126, even if the scratch or dirt is a scratch or dirt which is not problematic when the leader block 126 is ordinarily used as the door, it may become difficult for the leader block 126 to fit-together with the reel hub 130, and there is the possibility that problems in the moving of the magnetic tape T may arise.

Further, since the leader block 126 forms a part of a winding surface for winding the magnetic tape T, the above-described damage or contamination may damage the data recorded on the magnetic tape T or may create damaged areas on the magnetic tape T where data cannot be recorded.

Furthermore, since the leader block 126 is merely anchored at the edge of the opening 124, the leader block 126 may come off when the case 122 is dropped. Moreover, since the size of the leader block 126 is larger than the size of the leader pin, many constraints are imposed on the form of the case 122.

SUMMARY OF THE INVENTION

In view of the aforementioned, an object of the present invention is to provide a recording tape cartridge in which an opening, which is adapted to minimize a distance of a path for drawing out a recording tape, can be opened or closed by a shielding member, which allows to reduce a space in a drive for accommodating the cartridge, without interfering with a reel and a leader member, as well as a structure of an opening/closing device of the drive, which operates the shielding member to open or close the opening, can be simplified.

In order to achieve the above object, a recording tape cartridge relating to the present invention is formed by an upper case and a lower case being joined together by screws. The recording tape cartridge has a rectangular case, and a portion having an opening for pulling-out of a leader member attached to an end portion of a recording tape. The case accommodates a single reel, on which the recording tape is wound, such that the reel is rotatable. The opening is formed by cutting off a corner portion of the case at a side of loading the case into a drive device. Moreover, there are a pair of screw bosses, for screwing-in of screws, which are positioned at both edge portions of the opening. The recording tape cartridge also has a closing member which is provided at the case, and closes the opening by being positioned at an outer side of one of the screw bosses and an inner side of another of the screw bosses, and opens the opening by moving toward the other screw boss.

At the recording tape cartridge of the present invention, when the recording tape is not being used, the closing member is positioned so as to wind its way past the outer side of the one screw boss and the inner side of the other screw boss, which are positioned at the both edge portions of the opening, and the closing member closes the opening. Namely, the closing member either contacts or is positioned extremely close to the outer side of the one screw boss and the inner side of the other screw boss. In this way, the entry of dust and the like into the case is prevented.

When the recording tape is to be used, the closing member is moved by an opening/closing means of the drive device toward the other screw boss (the screw boss which is positioned at the outer side of the closing member), and the opening is opened. The leader member is pulled out from the opening which has been opened, and is guided to a take-up reel by the pull-out means of the drive device. The recording tape is pulled out successively from the case while being taken-up onto the take-up reel, and information is recorded or played back by a recording/playback head or the like disposed along a predetermined tape path. Further, after the recording tape has been used, the closing member moves in the direction opposite to the direction at the time of opening the opening, and returns to its initial position of closing the opening.

Here, the opening is formed by cutting off a loading side corner portion of the rectangular case. The plane of opening of the opening is directed in the direction of loading the case into a drive device, and in a direction orthogonal to the loading direction. Namely, the plane of opening is inclined with respect to the loading direction. The pull-out means can access the leader member from the loading direction side, from a direction orthogonal to the loading direction, or from the direction of the corner portion (a direction intersecting the aforementioned direction of inclination).

Thus, it is possible to design a drive device in which the path for pulling-out the recording tape is the shortest. Moreover, because there is no need for a drive mechanism for making the pull-out means circle around and engage the leader member, it is possible to design a compact, inexpensive drive device. In addition, because the pair of screw bosses are positioned at the both edge portions of the opening, the drop strength in the vicinity of the opening of the case is good. Moreover, the closing member which is disposed at the inner side of the other screw boss is protected, by this other screw boss, with respect to the impact of a drop.

As described above, the closing member opens the opening by moving toward the other screw boss which is positioned at the outer side of the closing member. Thus, at the time of opening and closing the opening, the closing member can open and close the opening which is formed at an incline, by circling around the outer sides of the reel and the leader member while hardly jutting out at all from the region of the outer shape of the case.

Thus, the space for accommodating the recording tape cartridge within a drive device is small, and the locus of movement of the closing member does not interfere with the leader member and the reel within the case. Moreover, in the state in which the opening is closed, the closing member is positioned at the outer side of the one screw boss. Thus, the leader member can be disposed in a vicinity of the plane of opening of the opening, and the operation for holding (e.g., engaging, catching, grasping) the leader member by the pull-out means of the drive device is easy. Note that, for example, a flat-plate-shaped member which circles around the outer side of the leader member and the like by rectilinear movement and rotational movement, or an arc-shaped member whose configuration and locus of movement on a circumference coincide, or the like can be used as the closing member.

In this way, at the recording tape cartridge of the present invention, the closing member, which can make the accommodating space within a drive device compact, can, without interfering with the reel and the leader member, open and close the opening which is structured such that the pull-out path of the recording tape can be the shortest.

When the path for pulling-out of the recording tape is made to be the shortest as described above, the path of the recording tape also is short as a matter of course. Thus, the contact wear with a tape guide can be decreased. Moreover, by forming the opening by cutting off a corner portion of the case, the range of directions over which the pull-out means can access the leader member is broad as described above. Thus, the range of positions at which the leader member can be set within the case is broad, and the degrees of freedom in designing the drive device are increased. Further, because the closing member operates as described above, the positions at which the leader member can be set are not affected by the closing member (the range of positions at which the leader member can be set is not narrowed).

The closing member is provided separately from the leader member which is pulled out from the case, and there is no need to remove the closing member from the case. Thus, the closing member can be designed so as to not easily be dislocated due to the impact of a drop or the like. When the recording tape is not being used, the leader member is accommodated within the case whose opening is closed by the closing member. Therefore, it is difficult for the leader member to be scratched or dirtied. Thus, the pulling-out and the conveying of the recording tape within a drive device are not affected, and the recording tape itself is not damaged.

In the recording tape cartridge having the above-described structure, it is possible to structure the leader member to be disposed near to the screw boss which is positioned at the inner side of (the locus of movement of) the closing member. There are many cases in which the leader member is near to one of the screw bosses in order to avoid the affects of the impact of a drop. However, in this structure, because the leader member is set close to the screw boss which is positioned at the inner side of the locus of movement of the closing member, not only is the leader member protected from the impact of a drop, but also, the leader member can be disposed even closer to the plane of opening of the opening.

BRIEF DESCRIPTION OF THE DRAWINGS

FIGS. 7A and 7B are views showing a door forming the recording tape cartridge relating to the embodiment of the present invention, where FIG. 7A is a plan view and FIG. 7B is a side view.

DESCRIPTION OF THE PREFERRED EMBODIMENTS

A recording tape cartridge 10 according to an embodiment of the present invention will now be described on the basis of FIGS. 1–8. A schematic overall structure of the recording tape cartridge 10 is described first. An opening 20 and a door 40, which serves as a shielding member for opening and closing the opening 20, are described next. It should be noted that, for convenience of explanation, a direction in which the recording tape cartridge 10 is mounted in a drive indicated by arrow A is referred to as a forward direction or a front side of the recording tape cartridge 10, and a direction perpendicular to arrow A, i.e., a direction of arrow B is referred to as a rightward direction.

(Overall Structure of Recording Tape Cartridge)

Figure 1:
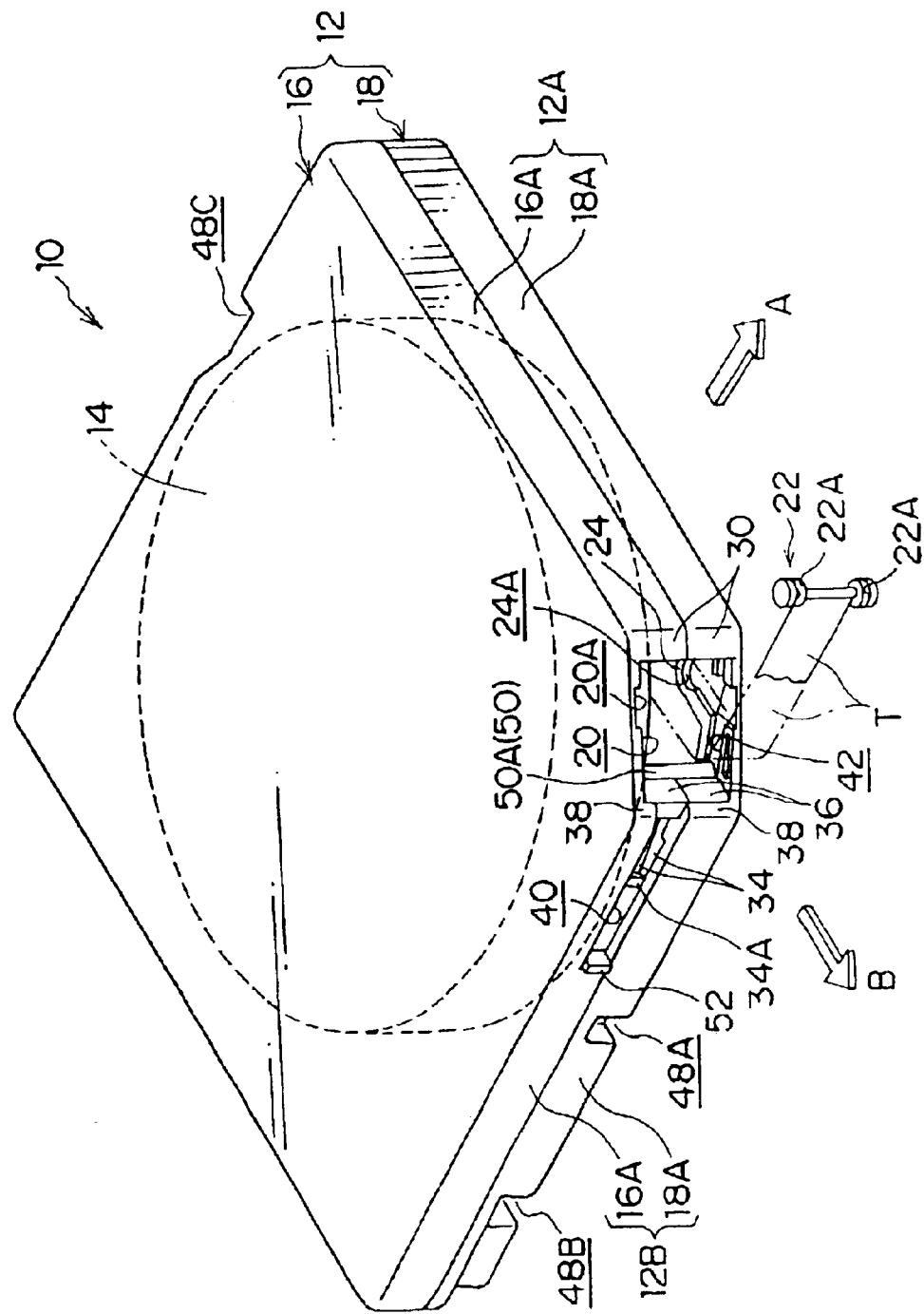
FIG. 1 is a perspective view showing the overall structure of a recording tape cartridge relating to an embodiment of the present invention.
Figure 2:
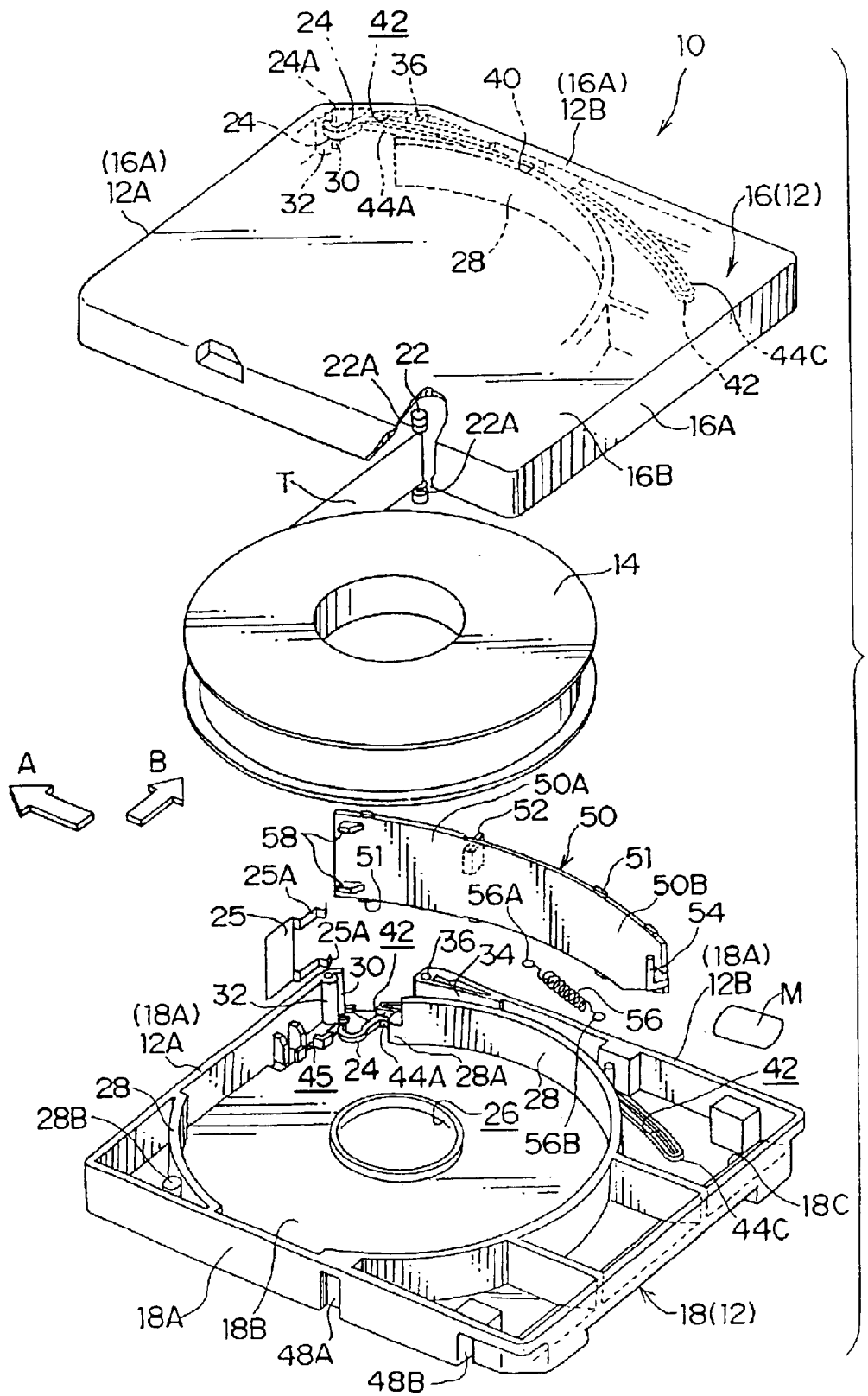
FIG. 2 is an exploded perspective view of the recording tape cartridge relating to the embodiment of the present invention.

As schematically shown in an exploded perspective view of FIG. 1, the recording tape cartridge 10 includes a case 12, which is substantially, rectangular when viewed from above. The case 12 rotatably accommodates a single reel 14. A magnetic tape T, which is an information recording/reproducing medium or a recording tape, is wound around the single reel 14.

The case 12 comprises an upper case 16 and a lower case 18, each of which is provided with a notch at one of corner portions thereof, being joined together. The corner portion is located at a side which comes first when the cartridge 10 is mounted in the drive, and may be regarded as a portion formed by cutting the peripheral wall 16A of the upper case 16 and the peripheral wall 18A of the lower case 18. The case 12 has a space therein for accommodating the reel 14, around which the magnetic tape T is wound. The corner portion serves as an opening 20, through which the magnetic tape T is drawn out.

A leader pin 22 is connected to a free end of the magnetic tape T drawn out through the opening 20. The leader pin 22 is anchored at or engaged with a drawing device of the drive to be drawn out. An annular groove 22A is formed at each of ends of the leader pin 22 projecting beyond width-directional ends of the magnetic tape T. The annular grooves 22A are anchored, for example, at hooks of the drawing device. Thus, the hooks do not contact and damage the magnetic tape T when the magnetic tape T is drawn out.

Further, a pair of upper and lower pin seats 24 for positioning and holding the leader pin 22 in the case 12 are disposed at the case 12 inside and in the vicinity of the opening 20. The pin stands 24 are formed in semi-cylindrical shapes which open in the direction of arrow B. Both end portions of the leader pin 22, which is in a state of standing upright, are held in concave portions 24A of the pin stands 24. The pin stands 24 are continuous with ribs 44 which will be described later.

A plate spring 25 is fixed in the vicinity of the pin stands 24. The plate spring 25 engages with the upper and lower end portions of the leader pin 22, and holds the leader pin 22 at the pin stands 24. When the leader pin 22 enters into and exits out from the pin stands 24, arm portions 25A of the plate spring 25 are appropriately elastically deformed, such that movement of the leader pin 22 is permitted.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by movement restricting walls 28 which partially project out at the inner surfaces of the upper case 16 and the lower case 18, and which serve as inner walls which are on a circular locus which is coaxial with the gear opening 26.

An enclosure 28A, in which a hole for position regulation is formed, is continuous with the end portion of the movement restricting wall 28 in a vicinity of the opening 20. Further, an enclosure 28B, in which is formed a hole for position regulation which is a long hole, stands erect in the space sandwiched between the front left corner portion of the case 12 and the movement restricting wall 28. The enclosures 28A, 28B are disposed on a single straight line which extends along the direction of arrow B. End portions of the movement restricting walls 28, except for the end portion thereof at which the enclosure 28A is continuous, are continuous with the peripheral wall 16A or the peripheral wall 18A of the case 12, so as to partition the outer sides of the movement restricting walls 28 and the space at which the reel 14 is set.

A memory board M, which stores various types of information, is set at the rear right portion of the lower case 18 for each recording tape cartridge 10. A portion of a rear wall 18C forming the peripheral wall 18A is inclined at a predetermined angle and the memory board M is disposed so as to be inclined at a predetermined angle, such that sensing is possible at a drive device which reads from the bottom surface side and at a library device which reads from the rear surface side. Further, an unillustrated write-protect tab, which is set so that recording of information onto the recording tape cartridge 10 is possible or is not possible, is provided at the left rear portion of the lower case 18.

(Opening, and Structure of Case in Vicinity of Opening)

As described above, the opening 20 is formed by cutting off the front right corner portion of the case 12. The plane of opening of the opening 20 is directed in the direction of arrow A and in the direction of arrow B. Thus, the pull-out means of a drive device can access and engage the leader pin 22 from the direction of arrow A, or from the direction of arrow B, or from between the direction of arrow A and the direction of arrow B. In this way, the area over which the pin stands 24 which hold the leader pin 22 can be set is broadened, and the region at which the pull-out means of the drive device can engage the leader pin 22 is broadened. Thus, the positions where the pin stands 24 are set can be determined in accordance with the specifications of the drive device which engages the leader pin 22 from the direction of arrow A or from the direction of arrow B. Therefore, the degrees of freedom in designing the drive device are increased.

Figure 3:
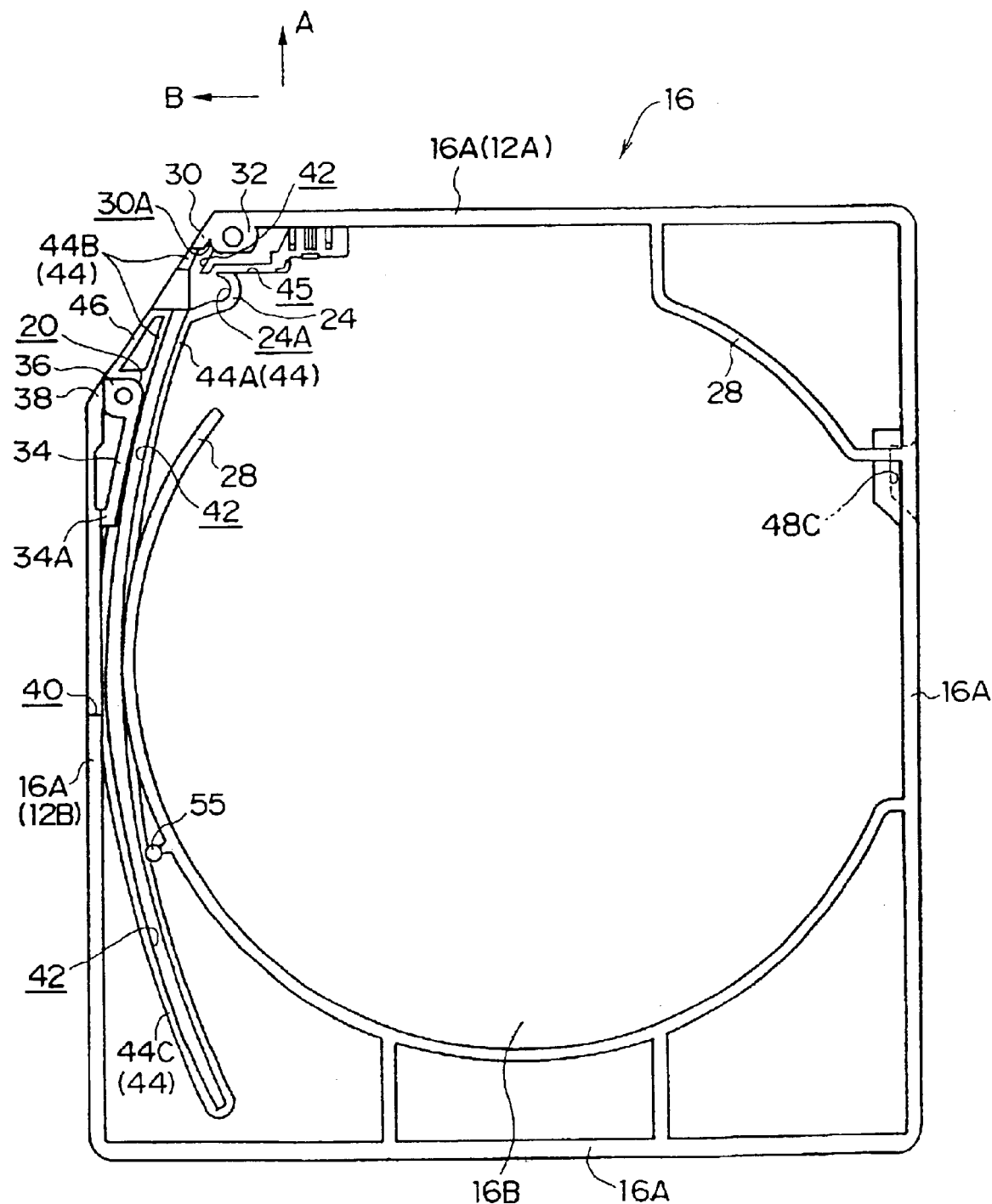
FIG. 3 is a bottom view of an upper case forming the recording tape cartridge relating to the embodiment of the present invention.
Figure 4:
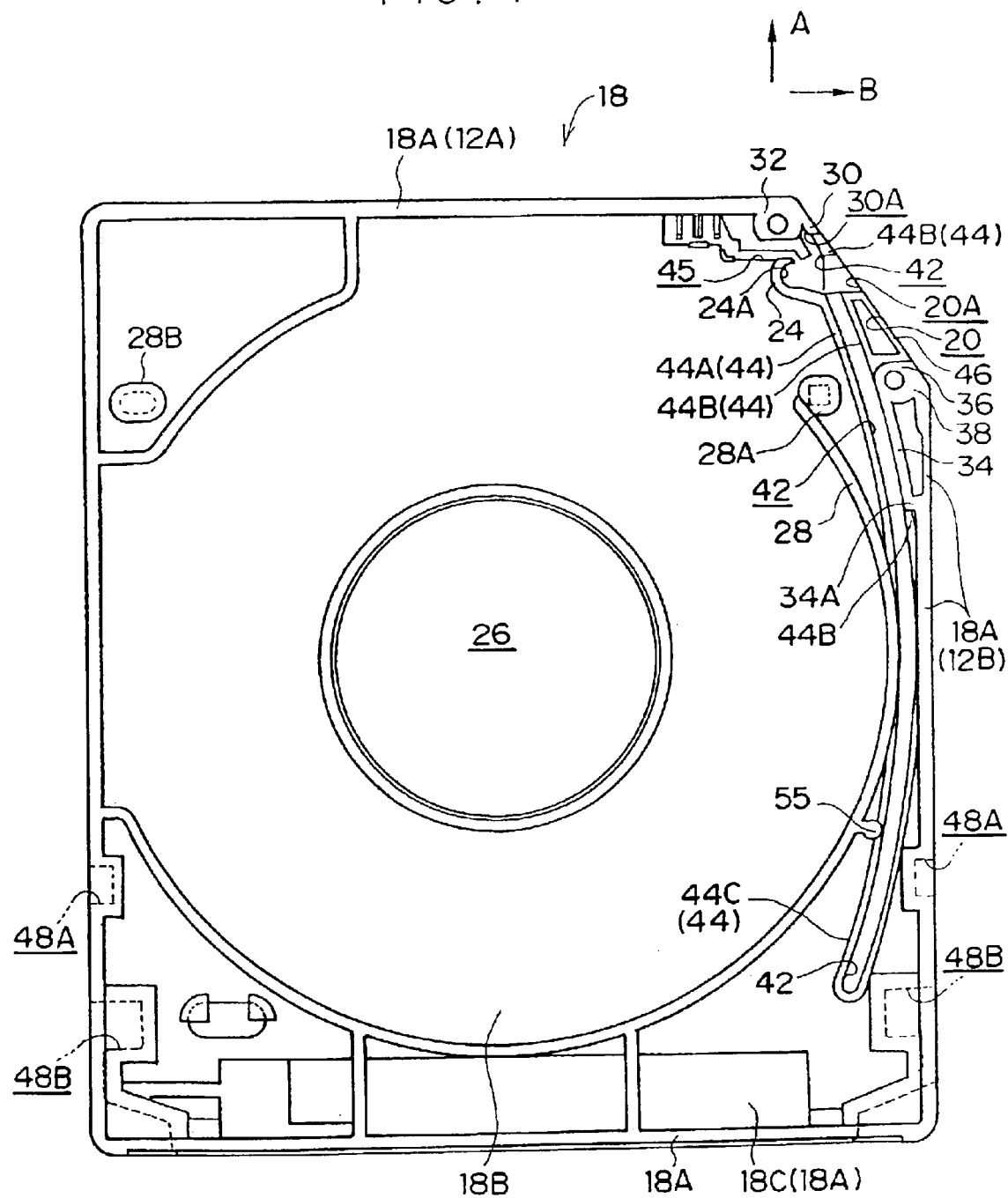
FIG. 4 is a plan view of a lower case forming the recording tape cartridge relating to the embodiment of the present invention.

As shown in FIG. 3 (which is a bottom view of the upper case 16) and in FIG. 4 (which is a plan view of the lower case 18), a pair of upper and lower screw bosses 32 and a pair of upper and lower screw bosses 36 are provided at the front and rear edge portions of the opening 20, respectively. The screw bosses 32, 36, as well as other screw bosses which are not illustrated, are for the screwing-in of screws which connect the upper case 16 and the lower case 18.

The screw bosses 32, which are positioned at the front edge portion of the opening 20, are continuous with the right end portion of a front wall 12A of the case 12 (the front wall 12A is the portions of the peripheral walls 16A, 18A whose outer surfaces are directed in the direction of arrow A), and are continuous with a pair of upper and lower dustproofing walls 30 which are short and are bent along the plane of opening of the opening 20 from the right end portion of the front wall 12A. Concave portions 30A, into which the distal end portion of a door 50 which will be described later enters, are formed between the screw bosses 32 and the dustproofing walls 30.

The screw bosses 36, which are positioned at the rear edge portion of the opening 20, are continuous with bent walls 38 and with a pair of upper and lower arc-shaped walls 34. The bent walls 38 are formed such that the front end portion of a right wall 12B of the case 12 (the right wall 12B is the right side walls of the peripheral walls 16A, 18A which run along the direction of arrow A) is bent substantially along the plane of opening of the opening 20. The arc-shaped walls 34 are provided at the inner side of the right wall 12B. The upper and lower arc-shaped walls 34 are formed in an arc-shape which, in plan view, substantially corresponds to (the locus of movement of) the outer peripheral surface of the door 50 which will be described later. The upper and lower arc-shaped walls 34 extend rearward from the screw bosses 36 by a predetermined length, and are continuous with the right wall 12B (the peripheral wall 16A or the peripheral wall 18A) via short connecting walls 34A at the rear portions thereof.

Figure 5:
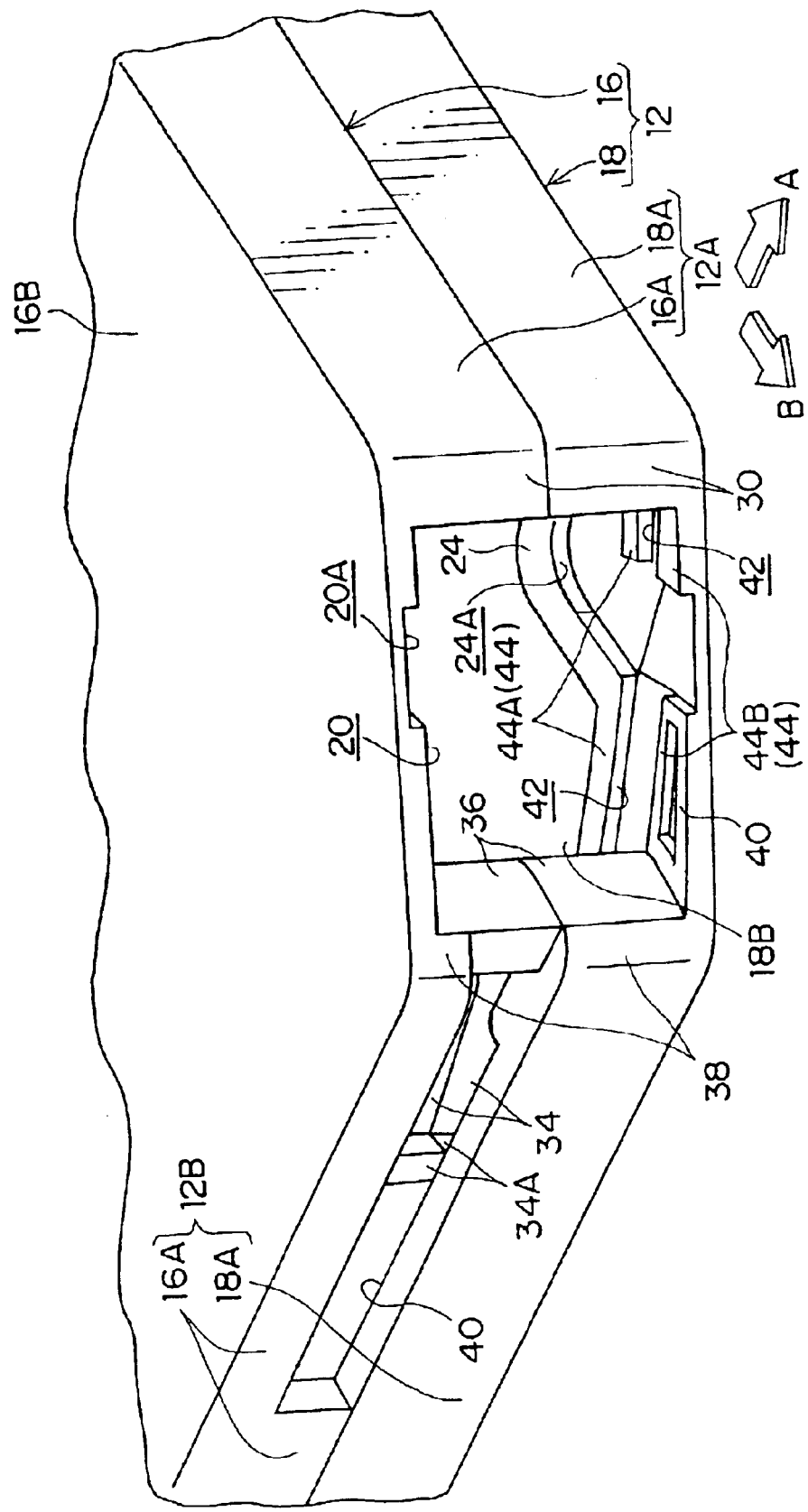
FIG. 5 is a perspective view showing, in an enlarged state, an opening and a slit of the recording tape cartridge relating to the embodiment of the present invention.

As shown in FIG. 5 as well, a slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting out the lower portion of the peripheral wall 16A which forms the right wall 12B. The slit 40 opens toward the front as well by also cutting out the lower portion of the bent wall 38 of the upper case 16. Namely, the lower end portion of the slit 40 is prescribed by the peripheral wall 18A and the top end surface of the bent wall 38 of the lower case 18. In this way, the slit 40 is positioned above an abutment portion (parting line) between the upper case 16 and the lower case 18.

The upper and lower ends of the slit 40 are prescribed by a portion of the peripheral wall 16A which also functions as a rib, and by the peripheral wall 18A. Thus, the rigidity of the case 12 is maintained, which is preferable in terms of the drop strength. Moreover, the slit 40 is provided independently of the opening 20, with the screw bosses 36 being disposed between the slit 40 and the opening 20. Thus, the rigidity of the corner portion at the rear edge of the opening 20 is high, which is even more preferable in terms of the drop strength.

Returning to FIGS. 3 and 4, a guide groove 42 which guides the door 50 is provided in each of the upper case 16 and the lower case 18 forming the case 12. The groove walls of the guide grooves 42 are structured by the ribs 44 standing erect at a ceiling plate 16B of the upper case 16 or a bottom plate 18B of the lower case 18, the right wall 12B (either the peripheral wall 16A or the peripheral wall 18A), and the movement restricting walls 28. The guide grooves 42 are formed without making the ceiling plate 16B or the bottom plate 18B thinner.

Each guide groove 42 is formed in an arc-shape which runs along a predetermined circumference whose proximal end is the concave portion 30A and which reaches the right rear corner portion of the case 12. This predetermined circumference is determined so as to pass (thread its way through) at the outer side of the screw bosses 32, the inner side of the screw bosses 36, and between the right wall 12B and the movement restricting walls 28. In the present embodiment, the central position of this predetermined circumference (i.e., the center of rotation of the door 50 which will be described later) is set such that the left-right direction position (coordinate) thereof substantially coincides with a position further toward the outer side than the left end of the case 12, and the front-back direction position (coordinate) thereof substantially coincides with the center of rotation of the reel 14 (the axial center of the movement restricting walls 28).

Namely, at the portion where the movement restricting walls 28 are the closest to the right wall 12B, the movement restricting walls 28 and the right wall 12B form the groove walls of the guide grooves 42. The rear edge of the slit 40 is positioned slightly toward the rear of this portion (by an amount substantially corresponding to the thickness of the operation projection 52).

Figure 6:
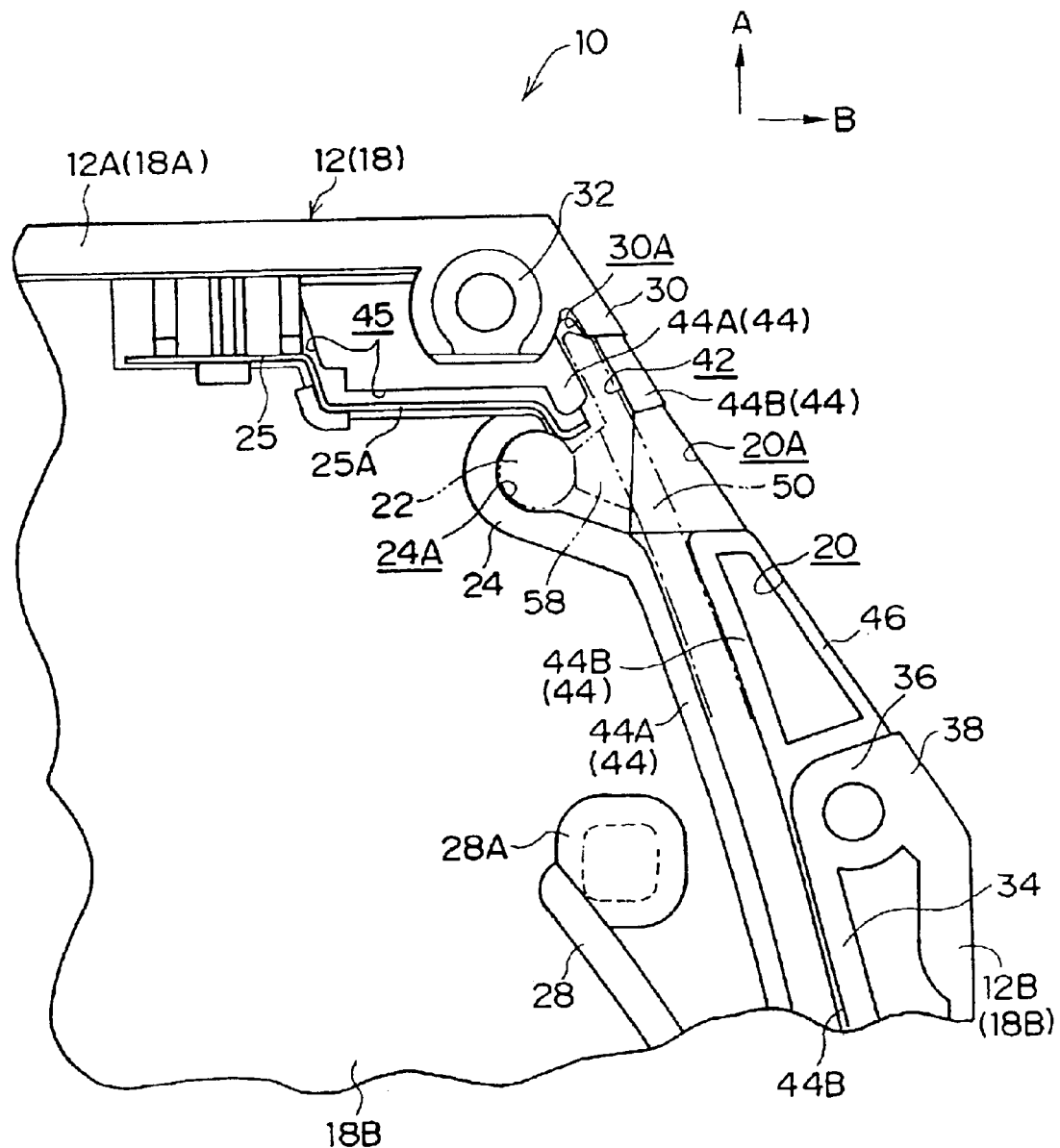
FIG. 6 is a plan view showing, in an enlarged manner, the vicinity of the opening of the lower case of the recording tape cartridge relating to the embodiment of the present invention.
Figure 8:
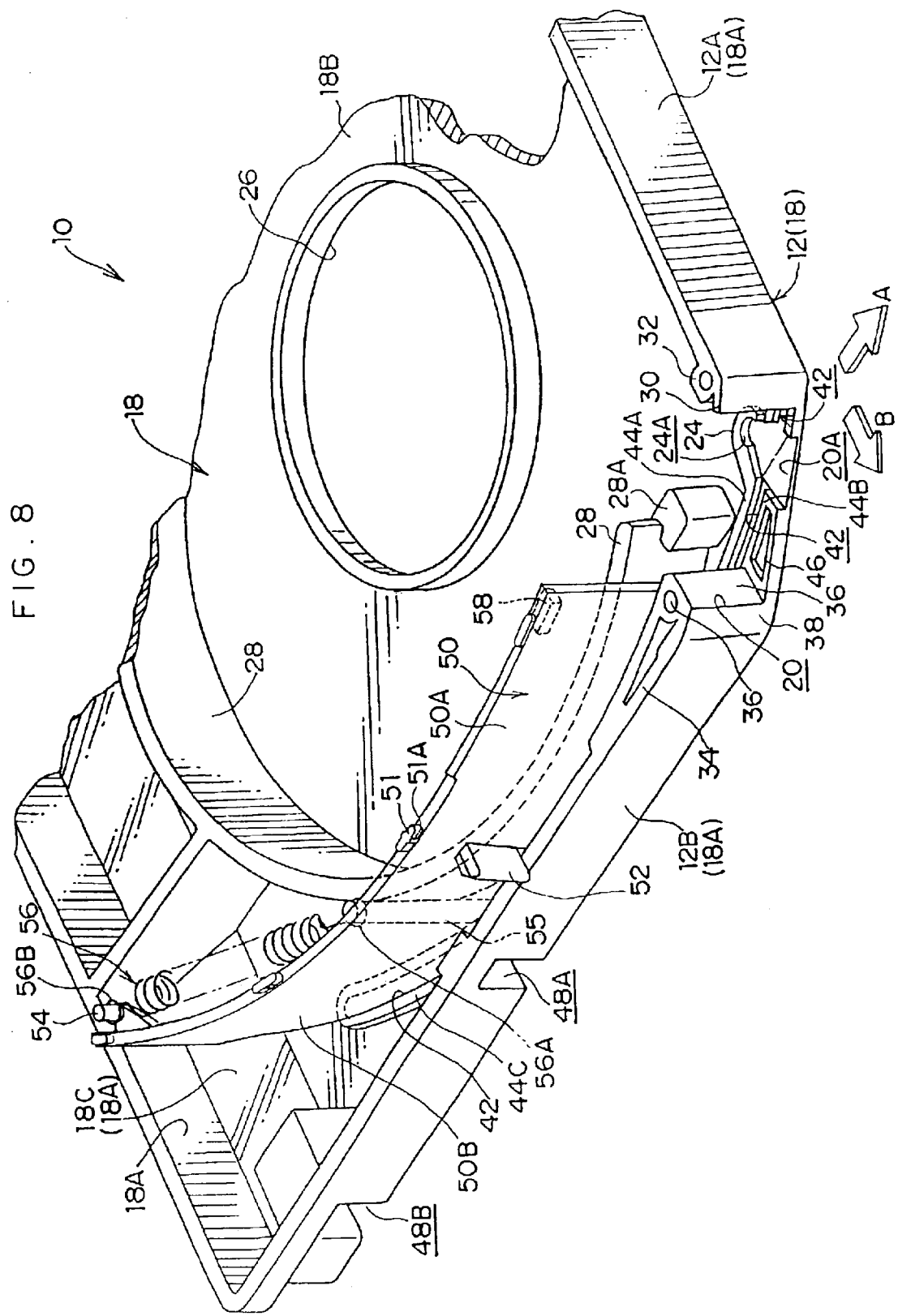
FIG. 8 is a perspective view, as seen with the upper case removed, showing an open state of the opening forming the recording tape cartridge relating to the embodiment of the present invention.

As shown in FIG. 6, at the rib 44, a rib 44A which forms the front half portion at the inner side of each guide groove 42 is cut-out at the right of the pin stand 24, and the rear edge portion of this cut-out portion is continuous with the pin stand 24. In this way, the guide groove 42 and the concave portion 24A are continuous. The front edge portion of the cut-out portion of the rib 44A is separated from the end portion of the pin stand 24, and forms a portion of a spring groove 45 at which the arm portion 25A of the plate spring 25 is disposed. The outer surface of the rear end of this rib 44A is continuous so as to contact the outer surface of the movement restricting wall 28.

A rib 44B, which forms the front half portion at the outer side of each guide groove 42, also is cut-out at the right of the pin stand 24. Portions of the ribs 44B, at the ceiling plate 16B and the bottom plate 18B, which are further toward the right side than an imaginary line which is orthogonal to the direction of arrow B and connects the front edge of this cut-out portion and the rear edge of the cut-out portion of the rib 44A, form taper openings 20A which guide the leader pin 22 into the case 12. Moreover, a rib 46, which is formed along the rear edge of the taper opening 20A, the front edge of the screw boss 36, and the plane of opening of the opening 20, respectively, is continuous with the rib 44B. In this way, the strength in the vicinity of the opening 20 can be ensured or improved. The intermediate portion of the rib 44B passes slightly more inwardly than the inner surface of the arc-shaped wall 34. The rear end portion of the rib 44B is continuous so as to inscribe the right wall 12B at the rear of the connecting wall 34A.

Moreover, at a rear end of a rib 44C, which forms the rear half portion of each guide groove 42, the rib 44C bends back in a substantial U shape. At the front end of the rib 44C, the inner side portion and the outer side portion are continuous so as to circumscribe the movement restricting wall 28 and inscribe the right wall 12B, respectively. Moreover, the rib 44C of the upper case 16 is formed to be longer than the rib 44C of the lower case 18. (Namely, at the upper case 16, the rear end of the rib 44C, which is closed in a substantial U shape, is positioned further toward the rear than that at the lower case 18.) This is in order for the rib 44C to not interfere with the memory board M and the door 50, because the rear wall 18C (peripheral wall 18A) of the lower case 18, at which the memory board M is disposed at the right wall 12B side, is formed as an inclined surface. Note that the rear end portions of the guide grooves 42, which are closed in substantial U shapes by the ribs 44C, can engage with convex portions 51 (to be described later) which are positioned the furthest rearward at the top and bottom of the door 50, in order to restrict further rearward movement of the door 50.

Further, at the rib 44 forming each guide groove 42, the ribs 44A and 44B, which are the substantially front half portion of the rib 44, are formed to be lower than the rib 44C which is the substantial rear half portion of the rib 44. For example, the height of the ribs 44A, 44B from the ceiling plate 16B or the bottom plate 18B is 1 mm, and the corresponding height of the rib 44C is 1.5 mm. This is in order to ensure space, in the vertical direction, for entry of the pull-out means of the drive device which engages and pulls out the leader pin 22. Thus, as will be described later, at the front half portion of the door 50 (at least the portion of the door 50 which closes the opening 20), the plate width (height) is formed to be larger (taller). Moreover, the heights of the pin stands 24 and the ribs 46 are set to be equal to those of the ribs 44A, 44B.

A pair of top and bottom spring catching pins 55 are provided at the longitudinally central portion of the inner side portion of the rib 44C. The spring catching pins 55 are continuous with the movement restricting walls 28. The spring catching pin 55 at the upper case 18 side is formed to be longer. One end side annular portion 56A of a coil spring 56 which will be described later catches on the portion of this spring catching pin 55 which projects higher than the movement restricting wall 28. The coil spring 56 is prevented from falling out due to the short spring catching pin 55 at the upper case 16 side abutting the spring catching pin 55 at the lower case 18 side.

A pair of left and right concave portions 48A, 48B, which are positioned further toward the rear than the rear edge of the slit 40, are provided at the case 12. The concave portion 48A, for example, forms an engagement portion which a pull-in means of the drive device engages. The bottom (downwardly-facing) surface of the concave portion 48A forms a reference surface for positioning within the drive device. The concave portion 48B forms an engagement portion which a grasping means of a library device engages. Moreover, a cell retention notch 48C, which serves as a concave portion which opens toward the top and the left, is provided at the left side portion of the case 12. Due to the cell retention notch 48C engaging with an engagement projection 60 of a drive device, the moment at the time when the opening 20 is opened and closed (the rotational moment accompanying the operation of the operation projection 52 exposed from the slit 40) is offset.

The case 12 is formed by the above-described upper case 16 and lower case 18 being fixed (joined) together by unillustrated screws being screwed into the screw bosses 32, 36 and other screw bosses from beneath, in a state in which the peripheral walls 16A, 18A of the upper case 16 and the lower case 18 oppose one another. As an example, the diameter of the thread ridge at the screw is $\phi 2.0$ mm, and the outer diameter of the screw bosses 32, 36 is $\phi 4.0$ mm. In this way, the corner portions at the both ends of the opening 20, which are positioned at the corner portion of the case 12 which is usually disadvantageous in terms of strength and which easily impact the ground or the like due to the case 12 being dropped, are strongly joined together. Even if the case 12 is dropped, there is no deformation, buckling, or positional offset due to the entire weight of the recording tape cartridge 10.

Further, at the area where the pin stands 24 are set (the vicinity of the opening 20), the plate thickness is 2.4 mm at both the upper case 16 and the lower case 18, which is thick as compared with the other areas (which have an average plate thickness of 2 mm). Moreover, the case 12 (the upper case 16 and the lower case 18) is formed of a polycarbonate (PC) material which has high mechanical strength. Note that, instead of PC, the case 12 may be formed of acrylonitrile butadiene styrene (ABS) or a metal material.

This is in order to increase the strength in the vicinities of the pin holding portions 24 which are the holding (positioning) positions of the leader pin 22 which are most important to the functioning of the recording tape cartridge 10 (in order for the leader pin 22 to be correctly engaged by the pull-out means at the time when the recording tape is pulled out), and is so that positional offset of the leader pin 22 does not arise due to impact when the case 12 (the recording tape cartridge 10) is dropped or the like.

The positions at which the pin stands 24 are set are determined to be further toward the inner side of the case 12 than an imaginary line (not illustrated) which connects the axial centers of the screw bosses 32, 36 which are positioned at the front and rear edge portions of the opening 20. Moreover, in the present embodiment, the pin stands 24 are disposed nearer to the screw bosses 32 than the screw bosses 36. In this way, positional offset of the leader pin 22 due to vibrations of the ceiling plate 16B and the bottom plate 18B when the case 12 is dropped or the like is prevented.

At the case 12, the peripheral wall 16A of the upper case 16 and the peripheral wall 18A of the lower case 18 are formed to the same heights, and the machining accuracies of the portions thereof which oppose one another (the accuracies of resin molding by a mold) are the same level. Thus, the case 12 has good assemblability and drop impact resistance. Moreover, the torsional strength of the case 12 is improved by providing the concave portions 48A, 48B, the cell retention notch 48C, and, as needed, other concave portions and the like.

The angle of inclination, with respect to the direction of arrow A, of the plane of opening of the opening 20 (the angle of inclination of the ceiling plate and the bottom plate of the case 12 which prescribe the top and bottom of the opening 20) is determined in accordance with the need to identify (recognize) the recording tape cartridge 10 at a library device. Namely, a library device is a device which accommodates a plurality of the recording tape cartridges 10, and automatically (i.e., without being aided by a human hand) loads and removes the recording tape cartridges 10 in drive devices. When there are plural types of recording tape cartridges 10 which are being handled and plural types of drive devices, there is the need to identify the generations or the recording capacities or the like of the recording tape cartridges 10. The angle of inclination of the plane of opening of the opening 20 can be used for such identification.

In this way, the opening 20 for pulling out of the magnetic tape T, which takes strength into consideration as described above, also functions as an identification portion at a library device in accordance with the angle of inclination of the plane of opening thereof (specifically, the angle of inclination of the ceiling plate 16B and the bottom plate 18B which prescribe the top and bottom of the opening 20). Thus, it is possible to prevent the strength of the case 12 from being insufficient, the dustproof quality of the case 12 from deteriorating, and the structure of the mold from becoming complex, which would be of concern if the opening 20 and the identification portion were provided separately (e.g., if one or plural through holes were formed in the case 12 as identification portions).

(Structure of Door)

The above-described opening 20 is opened and closed by the door 50 which serves as a closing member. As shown in FIG. 7A, the door 50 is formed in an arc-shape which curves along the direction of plate thickness thereof, and whose curvature as seen in plan view coincides with the curvature of the guide grooves 42 (the predetermined circumference). Further, as shown in FIG. 7B, the portion of the door 50 at the front portion thereof (at least the portion thereof which closes the opening 20) where the plate width (height) is formed to be substantially equal to the opening height of the opening 20, is a closing portion 50A. The portion of the door 50 which is at the rear side of the closing portion 50A and whose plate width is slightly smaller than that of the closing portion 50A, is a driving portion 50B.

Figure 9A:
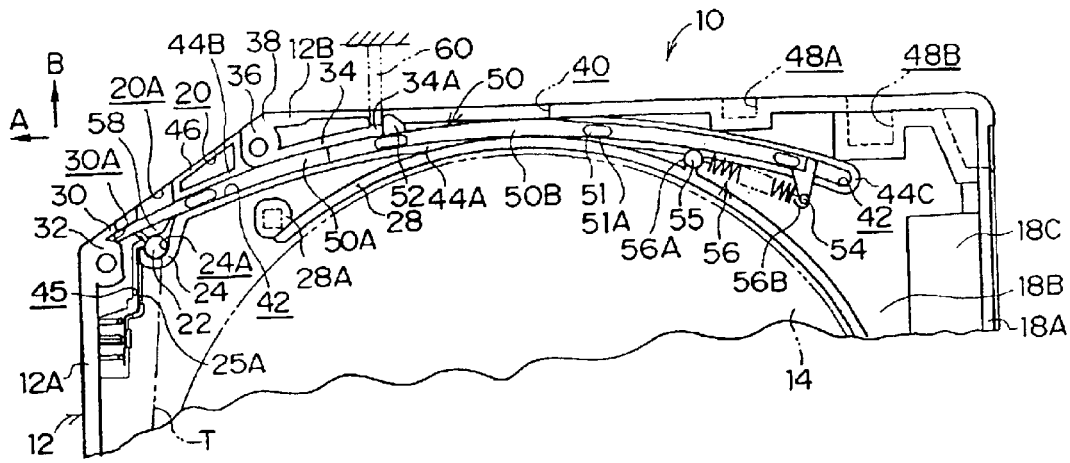
FIG. 9A is a view, as seen with the upper case removed, of a process of opening the opening of the recording tape cartridge relating to the embodiment of the present invention, and is a plan view showing an initial engaged state of an engagement projection of a drive device with an operation projection of the door.

The plate length of the door 50 (the curved longitudinal dimension thereof) is determined such that, in the state in which the door 50 closes the opening 20, the rear end portion of the driving portion 50B is positioned in the right rear corner portion of the case 12 (see FIG. 9A). Note that the bottom rear portion of the driving portion 50B is cut obliquely in order to avoid the memory board M which is disposed obliquely at the rear wall 18C.

The door 50 closes the opening 20 (see FIG. 9A) in a state in which the distal end portion of the closing portion 50A enters into the concave portions 30A, which are positioned at the outer sides of the screw bosses 32, and the rear portion of the closing portion 50A substantially contacts the inner sides of the screw bosses 36 (the arc-shaped walls 34). When the door 50 moves (rotates) substantially rearward along the guide grooves 42 so as to open the opening 20 (see FIG. 9B) and the outer peripheral surface of the distal end of the closing portion 50A reaches the inner sides of the screw bosses 36, the opening 20 is completely opened (see FIG. 9C). Further, the door 50 closes the opening 20 by rotating in the direction substantially opposite to the direction at the time of opening the opening 20.

In this way, the door 50 is curved so as to open and close the opening 20 by rotating without jutting out from the predetermined circumference which is the locus of movement of the door 50. It suffices for the center of rotation and the radius of the door 50 (the configuration of the guide grooves 42) to be appropriately determined in accordance with the angle of the plane of opening of the opening 20, or the like, which is determined by the requirements of the library device, or in accordance with the positions of the front and rear edge portions of the opening 20 (the screw bosses 32, 36) which are determined by the requirements of the drive device.

Further, a plurality of convex portions 51, which enter into the upper and lower guide grooves 42, project at the upper and lower ends of the door 50. The projecting heights of the convex portions 51 differ at the closing portion 50A and the driving portion 50B. However, the distance from the central line in the widthwise direction of the door 50 (the central line along the longitudinal direction of the door 50) to the peak portion of each convex portion 51 is constant. In this way, the top and bottom convex portions 51 slide along the ceiling plate 16B or the bottom plate 18B which are the bottom portions of the guide grooves 42.

Projections 51A, whose peak portions run along the end surfaces in the direction of the plate thickness of the door 50, project at the both sides, in the direction of plate thickness of the door 50, of each convex portion 51. The projections 51A slide along the groove walls (the ribs 44 and the like) of the guide grooves 42. Note that the convex portion 51 which is positioned furthest toward the front is disposed such that, when the opening 20 is being opened or closed, it does not enter into the taper opening 20A which is continuous with the guide groove 42. In the state in which the opening 20 is open, the convex portions 51 which are positioned the furthest rearward at both the top and the bottom engage with the bent-back portions at the rear ends of the ribs 44C, and prevent further rotation of the door 50. In this state, the rear end portion of the door 50 (a spring catching portion 54 and the like which will be described later) are disposed so as to not interfere with the interior of the case and the memory board M.

At the time when the door 50 is opening and closing the opening 20, the door 50 is guided in the guide grooves 42 by the convex portions 51 and the projections 51A, and does not jut out from the aforementioned locus of movement. The door 50 twists its way through at the outer sides of the screw bosses 32 and the inner sides of the screw bosses 36 and between the right wall 12B and the movement restricting walls 28, and reliably opens the opening 20.

The operation projection 52, which serves as an operation portion, projects along the radial direction of the door 50 at the outer peripheral portion, in a vicinity of the front end (the closing portion 50A side) of the driving portion 50B of the door 50. The operation projection 52 is exposed to the exterior of the case 12 from the slit 40, and is positioned so as to be set apart slightly from the connecting wall 34A of the upper case 16 when the opening 20 is in a closed state, and can be operated from the portion of the slit 40 which is open toward the front at the cut portions of the bent walls 38. The dimension of the respective portions are determined (see FIG. 9A) such that, in this state, the distal end portion of the operation projection 52 does not project further than the outer surface of the right wall 12B (the region of the outer shape of the case 12). The connecting wall 34A is inclined so as to substantially coincide with the longitudinal direction of the operation projection 52.

Further, in the state in which the opening 20 is open, the operation projection 52 is positioned so as to be set apart slightly from the rear edge of the slit 40. Note that the dimensions of the respective portions are determined such that, in this state, the longitudinal direction of the operation projection 52 is substantially orthogonal to the right wall 12B of the case 12 (is substantially orthogonal to the direction of arrow A).

Further, the interior and exterior of the case 12 communicate through the slit 40 for exposing the operation projection 52. However, the adhesion of dust and the like to the magnetic tape T wound on the reel 14 is prevented by the slit 40 always being substantially closed due to, at the front side thereof, the door 50 (which extends along substantially the entire height within the case 12) and the arc-shaped walls 34 being extremely close to the slit 40 along a predetermined length, and, at the rear side thereof, the door 50 and the right wall 12B being adjacent.

The substantially L-shaped spring catching portion 54 projects toward the inner surface side of the door 50 at the rear end portion of the driving portion 50B of the door 50. The upper side of the spring catching portion 54 is the free end thereof. The spring catching portion 54 is for anchoring and holding the coil spring 56 serving as an urging means. Specifically, the annular portions 56A, 56B for anchoring are provided at the end portions of the coil spring 56. The spring catching pins 55 of the case 12 are inserted through the annular portion 56A such that the annular portion 56A is anchored and held at the case 12. The spring catching portion 54 is inserted through the annular portion 56B such that the annular portion 56B is anchored and held at the door 50 (see FIG. 8).

In this way, the door 50 is urged in the direction of closing the opening 20 by the urging force of the coil spring 56, and usually closes the opening 20. The coil spring 56 has a length which reaches the rear right corner portion of the case 12 in the state in which the door 50 closes the opening 20 as described above. Therefore, the space between the movement restricting walls 28 and the peripheral walls 16A, 18A (the rear wall 18C) at this rear right corner potion can be utilized effectively.

Stoppers 58, which abut the upper end portion side surface and the lower end portion side surface of the leader pin 22 when the opening 20 is closed, project at the inner surface of the closing portion 50A of the door 50. The stoppers 58 can reliably prevent the leader pin 22 from falling out from the pin stands 24 due to the impact of a drop or the like. Moreover, the inner surface and/or the outer surface at the distal end of the closing portion 50A of the door 50 is preferably formed in a tapered configuration such that this distal end can smoothly enter into the concave portions 30A. Tapered surfaces are formed at both the inner and outer surfaces at the door 50 of the present embodiment.

The above-described door 50 is formed of, for example, polyoxymethylene (POM) resin which has excellent wear resistance and a low coefficient of friction, as compared with the case 12 which is formed of PC. However, the operation projection 52 and the spring catching portion 54 may be formed by separate members (i.e., of different materials). Further, the convex portions 51 and the projections 51A may be formed integrally with the door 50 which is formed of POM. Or, the convex portions 51 and the projections 51A may be formed separately from the main body (the closing portion 50A and the driving portion 50B) of the door 50. When the convex portions 51 and the projections 51A are formed separately from the main body of the door 50, they may be formed of a resin material such as polyamide (PA), polytetrafluoroethylene (PTFE), polyethylene (PE), or the like, or a metal material, or of materials which have these materials as the main component. However, when the case 12 is formed of a metal material, the convex portions 51 and the projections 51A must be formed of a resin material in consideration of the wear resistance and prevention of noise.

Next, operation of the present embodiment will be described.

When the recording tape cartridge 10 having the above-described structure is not being used (i.e., is being stored, is being transported, or the like), the opening 20 is closed by the door 50. Specifically, due to the urging force of the coil spring 56, the distal end portion (front end portion) of the closing portion 50A of the door 50 enters into the concave portions 30A between the screw bosses 32 (outer side) and the dustproofing walls 30. The outer peripheral surface of the vicinity of the rear end portion of the closing portion 50A substantially contacts the outer peripheral surfaces of the inner sides of the screw bosses 36 (the inner walls of the arc-shaped walls 34), and the door 50 closes the opening 20.

When the magnetic tape T is to be used, the recording tape cartridge 10 is loaded into a drive device along the direction of arrow A. Accompanying this loading, as shown in FIG. 9A, the engagement projection 60, which serves as an opening/closing member forming the opening/closing means of the drive device, enters into the slit 40 which opens toward the front at the cut portions of the bent walls 38, and engages with the operation projection 52 of the door 50.

Figure 9B:
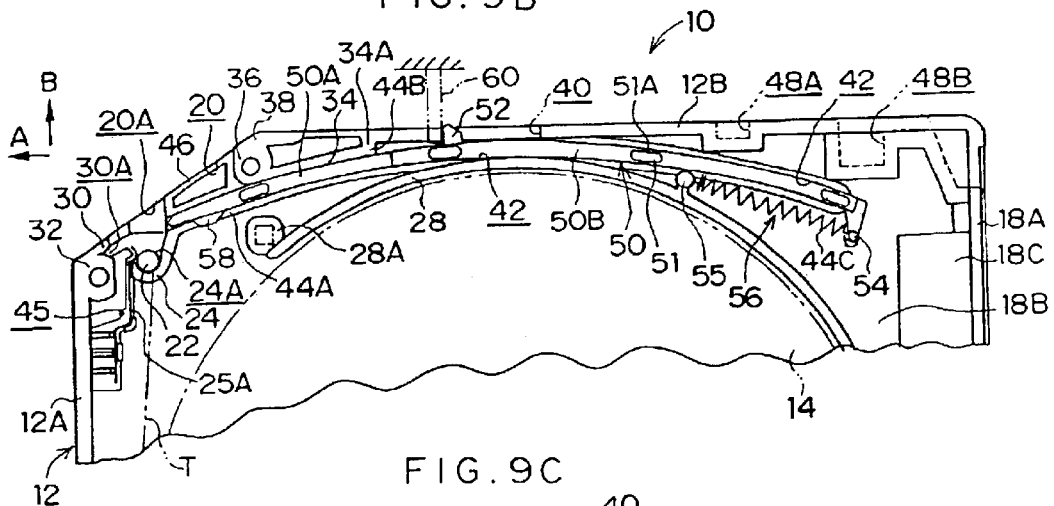
FIG. 9B is a view, as seen with the upper case removed, of the process of opening the opening of the recording tape cartridge relating to the embodiment of the present invention, and is a plan view showing a state during the opening of the opening.

When the recording tape cartridge 10 (the case 12) is pushed in further, as shown in FIG. 9B, due to the pushing-in force, the engagement projection 60 moves the operation projection 52 rearward against the urging force of the coil spring 56 (i.e., moves the operation projection 52 rearward relative to the case 12 which is loaded in the direction of arrow A).

Then, while the door 50, from which the operation projection 52 projects out, is guided by the pair of upper and lower guide grooves 42 at the convex portions 51 and the projections 51A, the door 50 rotates clockwise as seen in plan view along the direction of curving thereof. Namely, the door 50 hardly juts out at all from the locus of movement along the curved configuration thereof, and moves substantially rearward so as to circle around the outer sides of the pin stands 24 and the reel 14, and opens the opening 20.

Figure 9C:
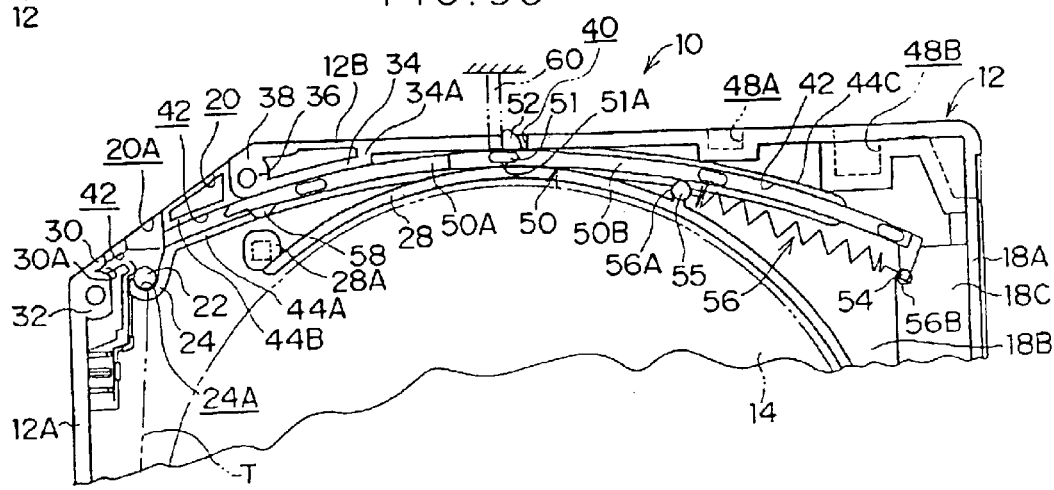
FIG. 9C is a view, as seen with the upper case removed, of the process of opening the opening of the recording tape cartridge relating to the embodiment of the present invention, and is a plan view showing a state in which opening of the opening has been completed.
Figure 10:
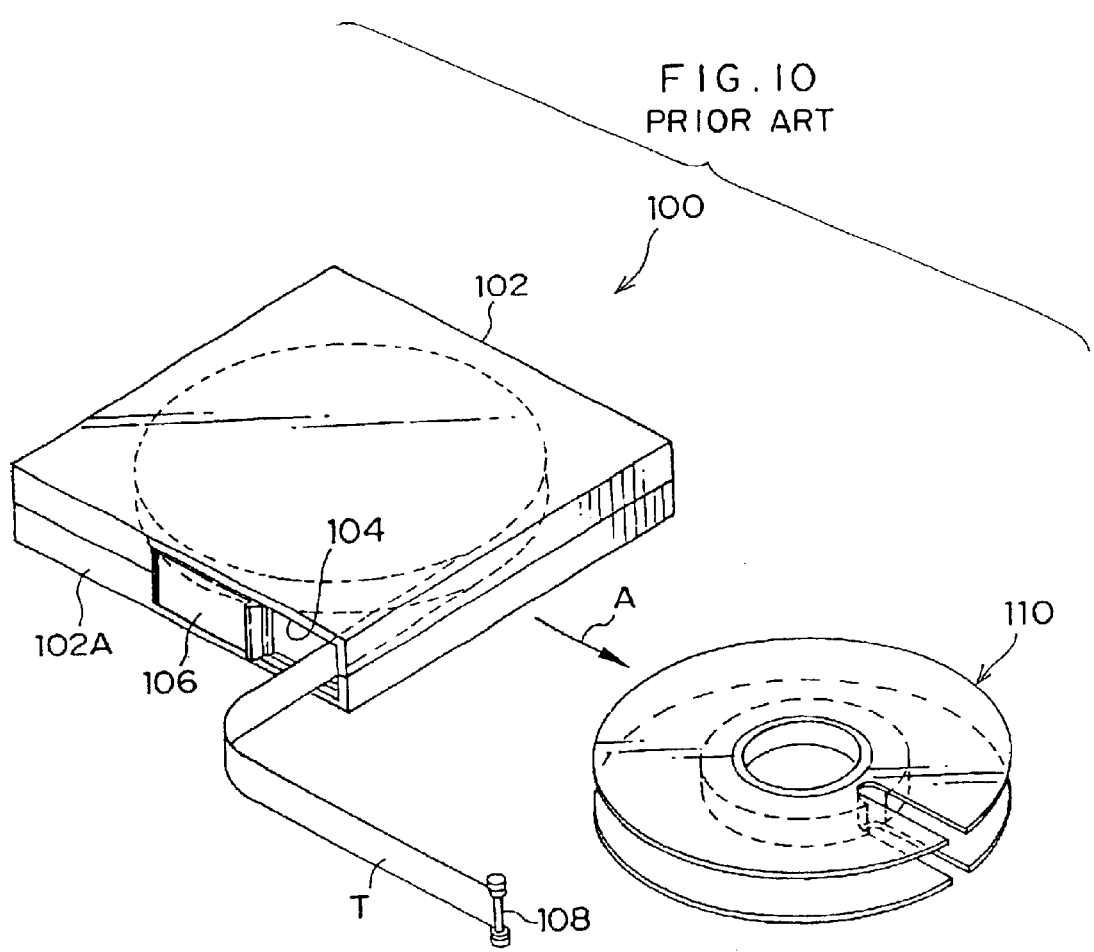
FIG. 10 is a perspective view showing an overall structure of a conventional recording tape cartridge.
Figure 11:
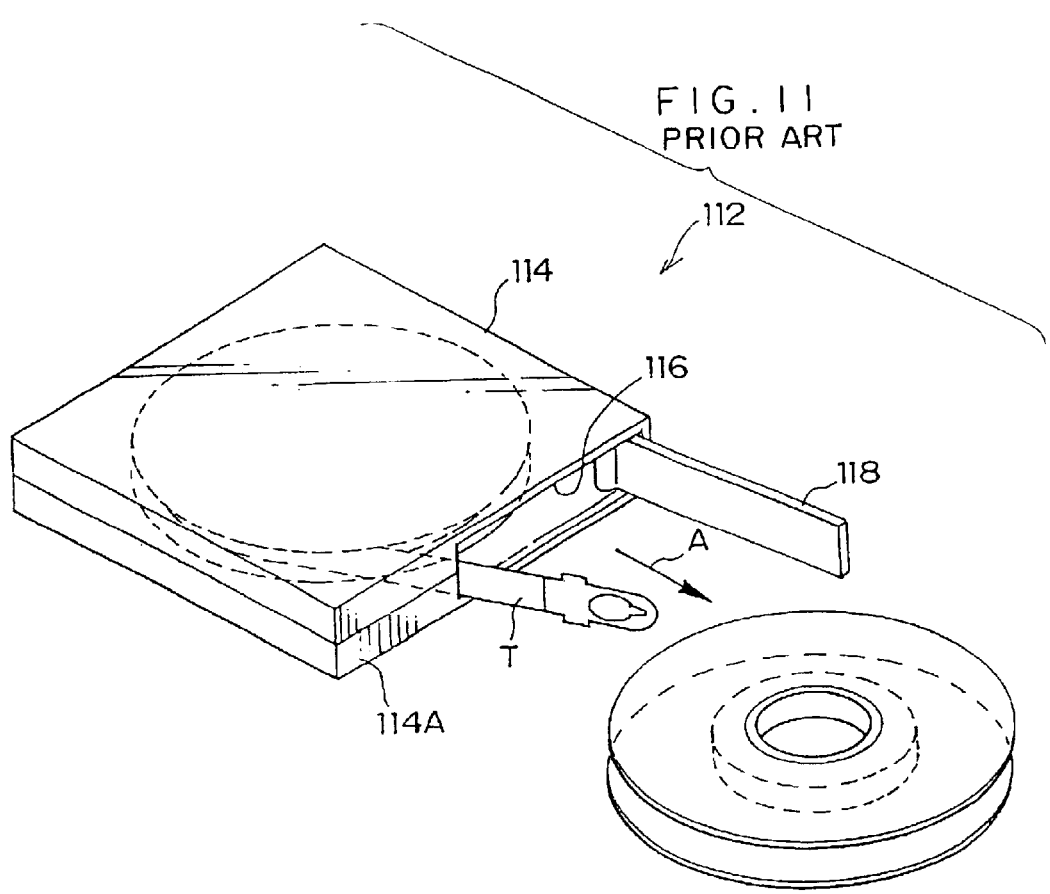
FIG. 11 is a perspective view showing an overall structure of a conventional recording tape cartridge.
Figure 12:
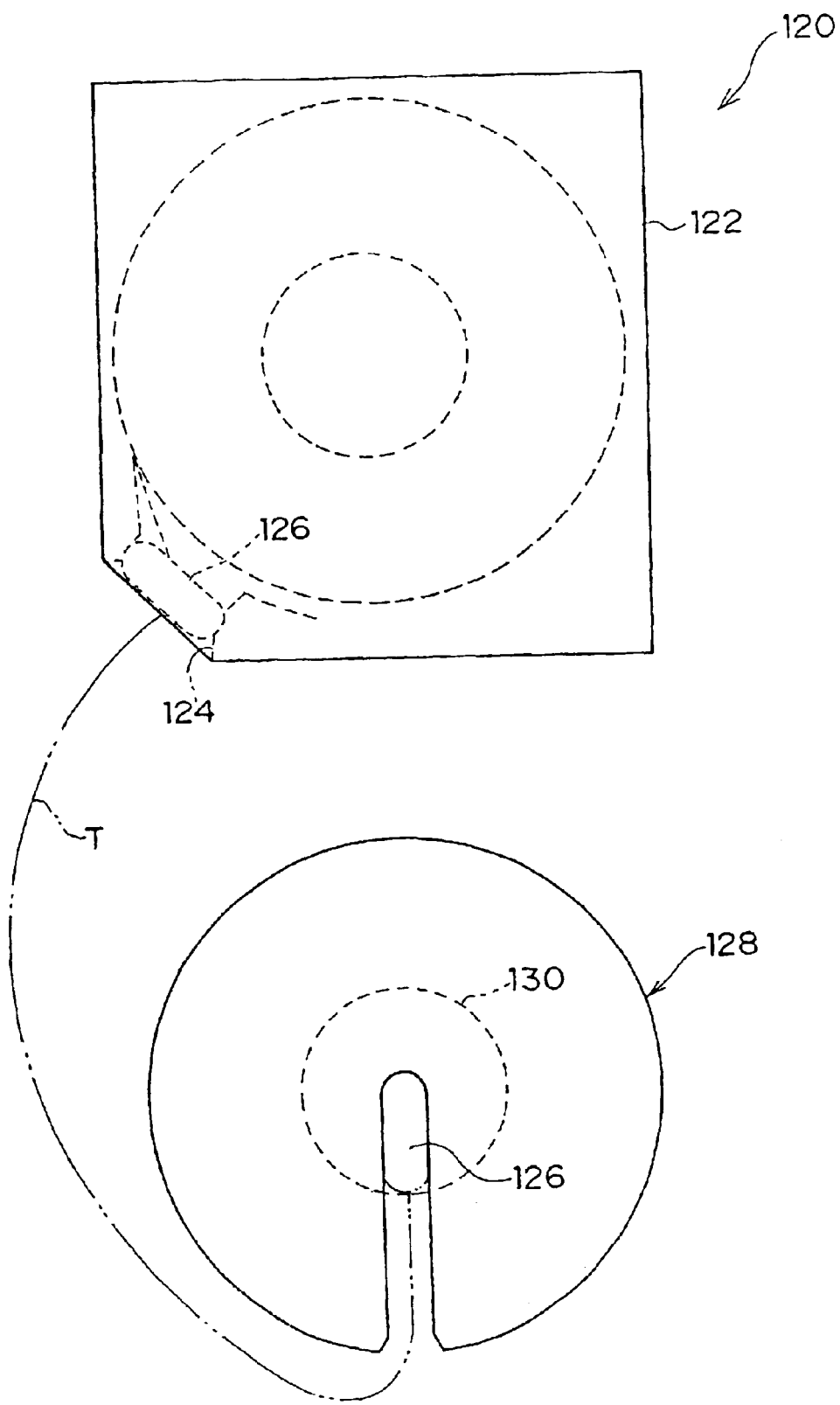
FIG. 12 is a perspective view showing an overall structure of a conventional recording tape cartridge.

Then, when the case 12 (the recording tape cartridge 10) is loaded to a predetermined depth in the drive device, the opening 20 is completely opened as shown in FIG. 9C. At this time, further rotation (substantially rearward movement) of the door 50 is restricted due to the convex portions 51, which are positioned furthest toward the rear at both the top and bottom, abutting the closed rear end portions of the ribs 44C.

In this state, when the recording tape cartridge 10 is positioned within the drive device, the pull-out means of the drive device enters into the case 12 from the opening 20 which has been opened. The pull-out means pulls-out the leader pin 22 which is positioned and held at the pin stands 24, and accommodates the leader pin 22 at a take-up reel. Due to the take-up reel and the reel 14 being driven to rotate synchronously, the magnetic tape T is successively pulled-out from the case 12 while being taken-up onto the take-up reel. Information is recorded or played back by a recording/playback head or the like disposed along the predetermined tape path.

When the magnetic tape T is rewound onto the reel 14 and the recording tape cartridge 10 is to be ejected from the drive device, the positioned state of the recording tape cartridge 10 is released, and the recording tape cartridge 10 is moved in the direction opposite to the direction of arrow A by the urging force of the coil spring 56 or by an unillustrated ejecting mechanism.

The door 50 is rotated in the direction of closing the opening 20 by the urging force of the coil spring 56, while being guided by the guide grooves in the same way as in the case in which the door 50 opens the opening 20. When the distal end portion of the closing portion 50A of the door 50 enters into the concave portions 30A, the door 50 is returned to its initial state in which the opening 20 is completely closed.

Here, the opening 20 is formed by cutting off a loading side corner portion of the rectangular case 12. Thus, the plane of opening of the opening 20 is directed in the direction of arrow A and the direction of arrow B (the plane of opening is inclined with respect to the direction of arrow A). In other words, the pull-out means of the drive device can access the leader pin 22 from the front surface side of the case 12 which faces in the direction of arrow A, and there is no need for the pull-out means to access the leader pin 22 from the outer side (the arrow B side) of the arrow B side peripheral walls (side walls) 16A, 18A. Thus, in the drive device, the path for pulling-out the magnetic tape T is the shortest, and there is no need for a drive mechanism for making the pull-out means circle around from the arrow B side of the case 12. Thus, the drive device can be made to be more compact and less expensive.

Because the screw bosses 32, 36 are positioned at the both edge portions of the opening 20, the drop strength of the case 12 in the vicinity of the opening 20 is good. The door 50, which is disposed at the inner sides of the screw bosses 36, is protected by the screw bosses 36 with respect to the impact of a drop.

Moreover, the door 50, which is curved in an arc-shape, opens and closes the opening 20 by rotating so as to circle around the outer sides of the reel 14 and the pin stands 24 (the leader pin 22), without jutting out from the locus of movement which runs along the curved configuration of the door 50. Thus, the door 50 does not jut out from the region of the outer shape of the case 12 at the time of opening and closing the opening 20. Therefore, the space for accommodating the recording tape cartridge 10 within a drive device is small, and the locus of movement of the door 50 does not interfere with the pin stands 24 (the leader pin 22) or the reel 14 within the case 12.

The locus of movement of the door 50 (the door 50 in the state of closing the opening 20) is positioned at the outer sides of the screw bosses 32 which are positioned at an edge portion of the opening 20. Therefore, the pin stands 24 which hold the leader pin 22 can be disposed in a vicinity of the plane of opening of the opening 20. In this way, when the pull-out means of the drive device operates to hold the leader pin 22 (e.g., rotates the hook portions within the case and makes the hook portions anchor on the annular grooves 22A), the pull-out means does not interfere with the respective portions within the case 12. In other words, the region, at which there is no need to consider the operation of the pull-out means within the case 12, is broadened, and the degrees of freedom in design are increased. In particular, at the recording tape cartridge 10, the pin stands 24 are disposed near to the screw bosses 32. Thus, not only is it possible to prevent positional offset of the leader pin 22 from the pin stands 24 due to vibration at the time of a drop as described above, but also, the pin stands 24 can be disposed closer to the plane of opening of the opening 20.

In this way, in the recording tape cartridge 10 relating to the present embodiment, the opening 20, which is structured such that the path along which the magnetic tape T is pulled out can be made to be the shortest, can be opening and closed without the door 50, which enables the space for accommodating the recording tape cartridge 10 within a drive device to be compact, interfering with the reel 14 and the leader pin 22. Further, because the door 50 is disposed so as to substantially contact the outer sides of the screw bosses 32 and the inner sides of the screw bosses 36, the door 50 can be protected from the impact of a drop, and the pin stands 24 can be set at optimal positions.

Moreover, as described above, the locus of movement of the door 50 is a circumference (the shape of a curve). Thus, it is possible to form a large opening 20 by cutting off a large amount of a corner portion of the case 12. Namely, in the present invention, instead of the door 50, it is possible to employ, for example, a flat-plate-shaped closing member (door). However, in a case in which the opening 20, which is inclined with respect to the direction of arrow A, is opened and closed by such a flat-plate-shaped closing member, when an attempt is made to accommodate this closing member within the region of the outer shape of the case 12 in the state in which the opening 20 is open, the opening 20 must be opened and closed while changing the posture of the closing member by rectilinear movement and rotational movement. The region over which the closing member operates is large, and the opening 20 must be made small (the cut amount of the corner portion of the case 12 at which the opening 20 is formed must be made small) in order for the region of operation of the closing member to not interfere with the leader pin 22 and the reel 14. In contrast, in the recording tape cartridge 10 relating to the present embodiment, as described above, the opening 20 can be made large by providing the door 50 which opens and closes the opening 20 by rotating without jutting out from the predetermined circumference.

In particular, the center of rotation of the door 50 for opening and closing the opening 20 whose plane of opening is inclined with respect to the direction of arrow A, can be determined independently of the axially central position of the reel 14. Thus, the angle of inclination of the plane of opening of the opening 20 with respect to the direction of arrow A, the size of the opening 20 (the distance between the front and rear edge portions thereof), and the like can be set arbitrarily, and it is possible to obtain a door 50 which opens and closes the opening 20 of an arbitrary configuration and arbitrary dimensions corresponding to the requirements of drives devices and the like. Namely, in a structure having the door 50, the degrees of freedom in designing the opening 20 (the recording tape cartridge 10) are increased.

Further, when the path for pulling-out the magnetic tape T is made to be the shortest as described above, the path of the magnetic tape T also is short as a matter of course. Thus, the contact wear of the magnetic tape T and a tape guide (e.g., a roller which is rotatably supported or the like) can be decreased.

Moreover, the opening 20 is formed by cutting off a corner portion of the case 12, and is directed in the direction of arrow A and the direction of arrow B. The range of directions over which the pull-out means (the hooks or the like) can access the leader pin 22 is broad. Thus, the range of positions at which the leader pin 22 can be set within the case 12 is broad. In addition, as described above, the locus of operation of the door 50 does not interfere with positions at which the leader pin 22 can realistically be set. Thus, the degrees of freedom in designing the drive device are increased.

The door 50 is a separate member from the leader pin 22 which is pulled out from the case 12. Thus, in the assembled state, the door 50 cannot be removed from the case 12. Namely, the door 50 does not come out from the case 12 due to impact or the like when the recording tape cartridge 10 is dropped. When the magnetic tape T is not being used, the leader pin 22 is accommodated within the case 12 which is in a tightly closed state in which the opening 20 is closed by the door 50. It is therefore difficult for the leader pin 22 to become scratched or dirtied. Thus, the pulling-out and the conveying of the magnetic tape T within a drive device are not affected, and the magnetic tape T itself is not damaged.

It suffices for the engagement projection 60 of the drive device to be disposed and fixed so as to be able to merely enter into the slit 40 from the front and engage with the operation projection 52 of the door 50. The structure is therefore simple. Moreover, because the door 50 closes the opening 20 due to the urging force of the coil spring 56, there is no need at the drive device for a mechanism for driving the door 50 in the direction of closing the opening 20. The structure of the opening/closing means (opening/closing member) of the drive device can be made to be even more simple.

Note that the recording tape cartridge relating to the present invention is not limited to the recording tape cartridge 10 relating to the above-described embodiment, and can be implemented by making appropriate changes within a scope which does not change the gist of the present invention. Accordingly, for example, the door 50 may open and close the opening 20 by rotating at the inner side of the front wall 12A. In this case, the door 50 is structured so as to pass along the inner sides of the screw bosses 32 and the outer sides of the screw bosses 36, and the pin stands 24 can suitably be disposed near the screw bosses 36. Further, in this case, the magnetic tape T may be wound reversely on the reel 14, and the concave portions 24A of the pin stands 24 may open toward the arrow A side.

Further, for example, the recording tape cartridge 10 is not limited to the preferable structure in which the door 50 is guided by the guide grooves 42. The door 50 may be guided by ribs or the like which appropriately (horizontally) project from the right wall 12 or the movement restricting walls 28. In addition, for example, the recording tape cartridge 10 is not limited to the preferable structure in which the slit 40 is provided at the right wall 12B of the case 12. The slit 40 may be provided in the bottom plate 18B or the like, and the operation projection 52 may be provided at the bottom surface of the door 50.

In the above-described embodiment, the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

As described above, the recording tape cartridge relating to the present invention has the excellent effect that a closing member, which enables the accommodating space within a drive device to be made compact, can open and close an opening, which is structured such that the pull-out path of a recording tape can be the shortest, without the closing member interfering with a reel and a leader member. In particular, because the closing member closes the opening while being positioned at the outer side of one screw boss and at the inner side of another screw boss, it is possible to both protect the closing member from external forces and to increase the degrees of freedom in designing the interior of the case.

What is claimed is:

1. A recording tape cartridge comprising:

a case which is rectangular, is formed by joining together an upper case and a lower case by screwing-in screws, and accommodates a single reel, on which a recording tape is wound, such that the reel is rotatable;

a portion having an opening which is formed by cutting off a corner portion of the case at a side of loading the case into a drive device, the opening being for pulling-out of a leader member attached to an end portion of the recording tape;

a pair of screw bosses for screwing-in of the screws, the screw bosses being positioned at both edge portions of the opening; and a closing member provided at the case, and closing the opening by being positioned at an outer side of one of the screw bosses and an inner side of another of the screw bosses, and opening the opening by moving toward the other screw boss.

2. The recording tape cartridge of claim 1, further comprising a pair of upper and lower pin stands provided at an inner side of the case, and the leader member is a leader pin whose both end portions are held at the pin stands.

3. The recording tape cartridge of claim 1, wherein the closing member is a door which is curved in an arc-shape, and the door can open and close the opening by rotating along the arc-shape.

4. The recording tape cartridge of claim 1, wherein the recording tape is a magnetic tape.

5. The recording tape cartridge of claim 1, wherein the one screw boss is a screw boss which is positioned at a front edge portion of the opening, and the other screw boss is a screw boss which is positioned at a rear edge portion of the opening.

6. The recording tape cartridge of claim 1, wherein the one screw boss is a screw boss which is positioned at a rear edge portion of the opening, and the other screw boss is a screw boss which is positioned at a front edge portion of the opening.

7. The recording tape cartridge of claim 1, wherein a center of rotation of the closing member can be set independently of an axially central position of the reel.

8. The recording tape cartridge of claim 1, wherein a center of rotation and a radius of the closing member are set in accordance with specifications of the portion having the opening.

9. The recording tape cartridge of claim 1, wherein the closing member is a member which can move rectilinearly.

10. The recording tape cartridge of claim 3, wherein the door has a closing portion which is formed to a same height as a height of the opening, and a driving portion whose width is smaller than a width of the closing portion.

11. The recording tape cartridge of claim 3, wherein the door is molded of a material having better wear resistance and a lower coefficient of friction than the case.

12. The recording tape cartridge of claim 5, wherein the screw boss which is positioned at the front edge portion of the opening is provided so as to be continuous with one end of a front wall of the case and with a pair of upper and lower dustproofing walls which are short and are bent along a plane of opening of the opening from the one end of the front wall, and a concave portion, into which a distal end portion of the closing member enters, is formed between the screw boss and the dustproofing walls.

13. The recording tape cartridge of claim 5, wherein the screw boss which is positioned at the rear edge portion of the opening is provided so as to be continuous with a bent wall formed by a front end portion of one wall of the case being bent along a plane of opening of the opening, and with front end portions of a pair of upper and lower arc-shaped walls provided at an inner side of the one wall.

14. The recording tape cartridge of claim 11, wherein a longitudinal dimension of the door is determined such that, when the door closes the opening, a rear end portion of the driving portion is positioned within a predetermined corner portion of the case.

15. The recording tape cartridge of claim 11, wherein the door is molded of polyoxymethylene resin.

16. The recording tape cartridge of claim 13, wherein the pair of arc-shaped walls are formed in arc-shapes so as to correspond to an outer peripheral surface of the closing member, and extend to predetermined lengths from the screw boss positioned at the rear edge portion of the opening, and are provided so as to be continuous with the one wall of the case.

* * * * *